Oct. 11, 1960

A. W. GAUBATZ 2,955,536

FUEL PUMP

Filed Jan. 20, 1955

INVENTOR
Arthur W. Gaubatz
BY
Paul Fitzpatrick
ATTORNEY

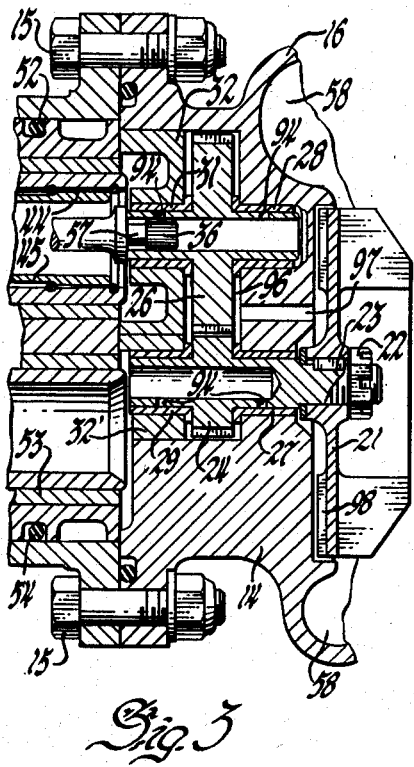
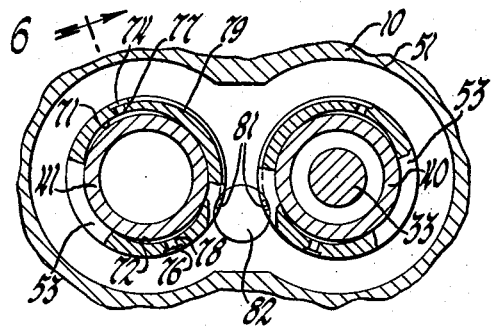
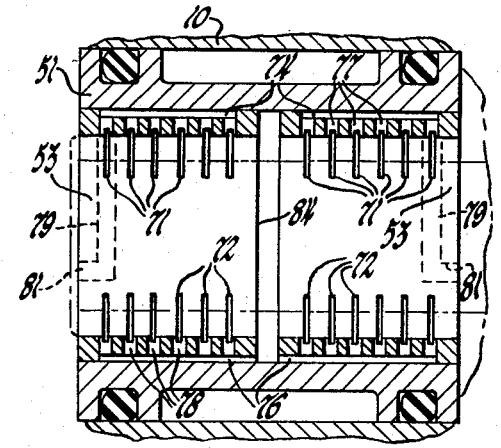
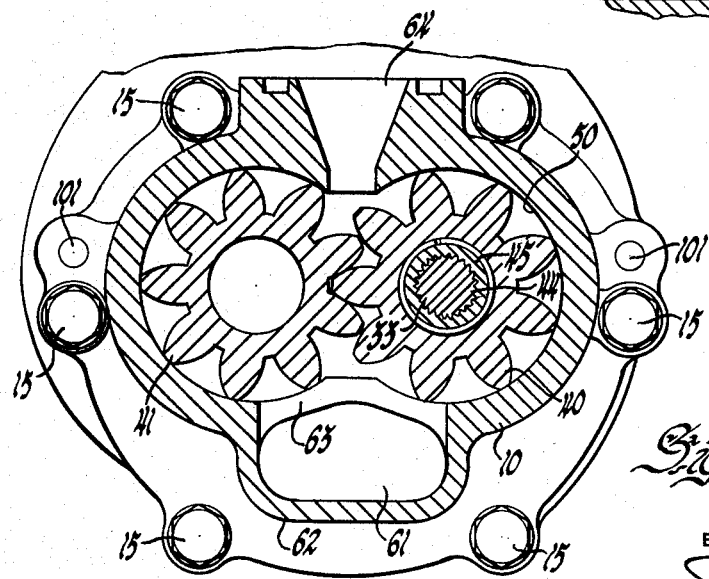

United States Patent Office 2,955,536
Patented Oct. 11, 1960

2,955,536

FUEL PUMP

Arthur W. Gaubatz, Indianapolis, Ind., assignor to General Motors Corporation, Detroit, Mich., a corporation of Delaware Filed Jan. 20, 1955, Ser. No. 482,927

7 Claims. (Cl. 103—4)

My invention relates to positive displacement pumps, and most particularly to pumps adapted for the very difficult service conditions encountered in supplying fuel to gas turbine engines. These conditions are difficult primarily because such fuels have extremely poor lubricating qualities, which makes it very hard to provide a pump which will deliver large quantities of the fuel at high pressures to meet engine requirements.

My pump is of the positive displacement gear type, which type has been most satisfactory for this type of service. However, severe wear of gear journals and bearings has been experienced in such pumps. The principal feature of the invention relates to structure by which fuel under pump inlet and discharge pressure is supplied to the gear trunnion bearings to counteract the thrust normal to the axis of the pumping gears and, in effect, float the gear trunnions on a film of fuel out of direct rubbing contact with the bearings.

A further difficulty with pumping aircraft turbine fuels lies in the difficulty of preventing undue leakage in the pump, since the fuels are rather thin and are pumped at high pressure. The pump according to the invention preferably involves novel principles of construction which make it possible to provide minimum clearances between the pumping gears and the cavities in which they rotate without danger of reducing the clearance to the point where excessive friction is developed.

The structure of the pump is such as greatly to facilitate precision manufacture, particularly in large quantity production.

By way of introduction, the preferred embodiment of the gear pump described herein comprises a body within which are mounted two gear pumps in axial alignment. This body is fixed to an end casting by which it is mounted on an engine. At the other end of the body there is preferably provided a centrifugal type priming pump from which fuel passes to the gear pumps. The three pumps are driven by a common input shaft. The gear pumps have separate outlets. The body is a broached part and the housing for the pump gears is defined by this body and bearing plates which are slid into the body to provide the pump cavities and support bearing sleeves for the pump gear trunnions. Further significant features of the pump and the advantages thereof will be more clearly apparent from the succeeding detailed description and the accompanying drawings in which:

Figure 3 is an enlarged view of a portion of Figure 2;

Figure 4 is a transverse sectional view taken on the plane indicated in Figure 1;

Figure 5 is a transverse sectional view taken on the plane indicated in Figure 2, showing the center bearing block; and Figure 6 is a sectional view of the center bearing block taken on the plane indicated in Figure 5.

Figure 1:
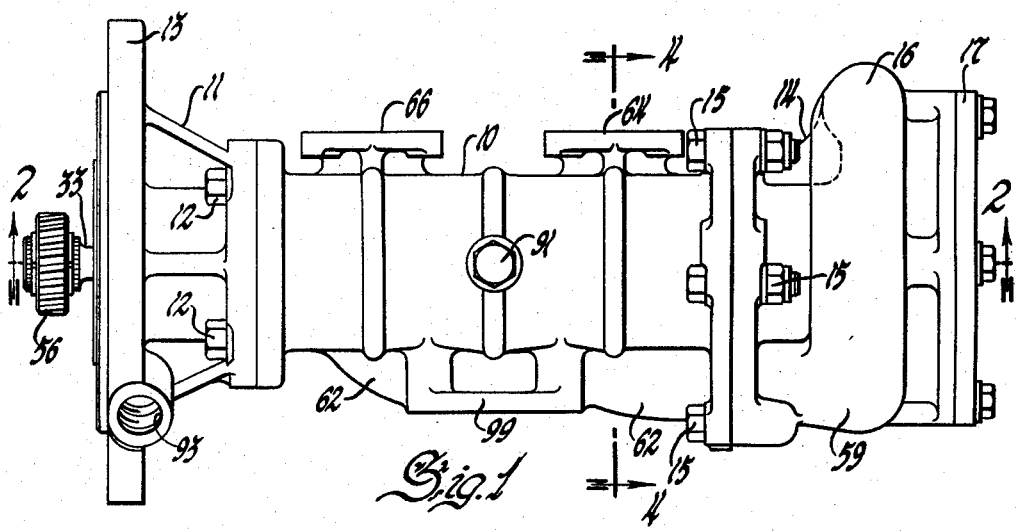
Figure 1 is a plan view of a pump in accordance with the invention.

Referring first to Figure 1, the pump comprises a body 10 which is faced off square and flanged at each end. At the drive end of the pump is an end casting 11 mounted on the body by cap screws 12. This end casting provides a bolting flange 13 by which the pump may be mounted on the gear case or the like of the engine by which it is driven. The other end casting 14 held by bolts 15 defines the scroll 16 of a centrifugal priming pump and has mounted thereon an inlet end cover 17. The end plate 17 pilots within the end casting 16 and leakage is prevented by an O-ring 19.

A small centrifugal pump impeller 21 (see also Figure 3) comprising a disk with generally radially extending blades in accordance with known practice is secured by nut 22 on centrifugal pump shaft 23. A gear 24 integral with shaft 23 is driven by a larger gear 26, both these gears being journaled for rotation in the end casting 14. Gear 26 is integral with a hollow shaft which provides a trunnion axis for the gear. The right hand trunnions of gears 24 and 26 are journaled in sleeves 27 and 28 mounted directly in the end casting. The left hand trunnions of the gears rotate in bushings or sleeves 29 and 31 mounted in blocks 32, 32' fitting in a recess in the inner face of the end casting. It will be noted that the sleeves provide both journal and thrust bearings for the set of gears and also for the impeller 21.

Gear 26 is driven by the pump drive shaft 33 which is common to both gear pumps and the centrifugal pump. Shaft 33 extends from a point external to the mounting flange 13 through a shaft seal 34, which may be of known commercial type, and terminates in an externally splined portion 36 which is coupled to internal splines in the trunnion of gear 26.

The two gear pumps driven by shaft 33 may be identical or substantially so, although if desired they may be of different sizes. The pumps are supplied in parallel, with independent outlets. The gear pump nearer the centrifugal pump comprises a driving gear 40 and a driven gear 41, the other pump comprising a driving gear 42 and a driven gear 43. These gears are all integral with hollow cylindrical trunnions extending from the faces of the gears. The driving gears are internally splined at 44 to couple with external splines on coupling members 45 which in turn are internally splined at 46 to engage splined portions 47 and 48 on drive shaft 33. The coupling members 45 are retained against axial movement by snap rings 49 in the gears on each side of the splines 44. The sets of pump gears mesh in the usual manner in cavities in the body 10 which are approximately of the shape of two overlapping circles, the cross section being apparent from Figure 4. The interior cavity 50 of the body is cylindrical in the geometric sense from end to end of the body. The entire inner surface may be regarded as generated by a moving line which is at all times parallel to the axes of the gears.

Support for the trunnions of the gears is afforded by a center bearing plate 51 and end bearing plates 52. The bearing plates 52 may be identical and the bearing plate 51 is a similar double bearing plate, since it provides for support of the adjacent trunnions of both sets of gears. The direct support for the gears is provided by bushings 53 pressed into cylindrical bores in the bearing plates and held against rotation by pins (not shown). The peripheral contour of the bearing plates is the same as the internal contour of the body 10 with such clearance that the bearing plates may be slipped into place in the body. O-rings 54 disposed in grooves in the periphery of the bearing plates prevent leakage from the pumping cavities outwardly between the bearing plates and the pump body. As will be apparent, the faces of the bearing plates adjacent the gear teeth are radial to the axis as are the outer faces of the gears, and the gears rotate in close clearance to the faces of the bearing plates and bearing sleeves therein. The manner in which the shaft 33 drives the several pumps should be apparent. The splined coupling member 56 on the outer end of the shaft is supported in and driven by the part of the engine which drives the pump and provides all necessary support for the outer end of the shaft, which has no bearing in the pump body or end casting 11. Any slight misalignment of the coupling member 56 with the axis of the two pump gears 40 and 42 is accommodated by the coupling members 45 by slight inclination of each coupling member. These coupling members also provide a safety feature in the event of jamming of one pump through gear failure or accidental introduction of foreign matter. The coupling member driving that pump will shear between the two splined portions. The central part of each coupling member is relatively soft and is of such dimensions as to shear at a point above the load which is normally put on the pump in service but well below the capacity of driving shaft 33. A shear feature is provided by a necked-down portion 57 of shaft 33 immediately adjacent the splines by which gear 26 is driven. Shaft 34 can twist apart at this point and still maintain the drive of the gear pumps in the event of casualty to the centrifugal pump.

In the operation of the pump, fluid enters through the inlet 18 and flows outwardly through the impeller 21 into the scroll cavity 58 which delivers it to an elbow 59 (Figure 1) in the casting 14 which opens into the right face of the pump body in alignment with a duct 61 defined by the walls of the pump cavity and a rib 62 extending longitudinally of the body. The body casting is cut away abreast each set of pumping gears to define inlets 63 (Figure 4) from which the fluid is taken by the pump gears and is discharged through outlet openings 64 and 66 (Figures 1 and 4). These outlet openings are provided with flanges and grooves for O-rings so that outlet pipes, filters, or other fluid fittings may be mounted on them.

It is known that pressures exerted by the fluid on the teeth of gear pumps have a resultant which is a very considerable force normal to the axis of each gear. The direction of the force remains substantially constant and the magnitude of the force is substantially proportional to the difference between the inlet and the output pressures. While some proposals have been made to tap fluid from the pump and conduct it to the pump trunnion bearings to provide a force on the trunnions counteracting the pumping forces on the gear teeth, I believe that such prior proposals as are known to me have been unsuccessful because they do not provide adequately for supply of fluid under pump discharge pressure to the zone of the bearing surface where it is needed, and particularly do not provide for adequate removal of the fluid so that it will not be carried around with the shaft and build up pressure more or less uniformly around the shaft, thus destroying the desired unbalanced pressure effect on the shaft. In the pump described herein, one circumferential zone of the bearing is connected to pump outlet pressure and an opposing circumferential zone is connected to pump inlet pressure or, in other words, is provided with a drain for pressure fluid. It is well known that when a shaft rotates in a closely fitting sleeve, the lubricating fluid is carried around with the shaft and particularly to the widely separated unloaded side. If this should occur with this type of bearing, then a new hydraulic force (possibly equal to the load balancing force) would be applied to the trunnion in a direction opposite to the desired load balancing force cancelling this balancing effect.

If a zone of the sleeve on the side opposite the balance area is vented to the low pressure or inlet side of the pump, then the effect of the balance force can never be destroyed by pressure creeping around the shaft into the unloaded side of the bearing. Actual experiments have shown that a pump with bearings according to the invention can be run with relatively thin fluids without any deleterious rubbing between the journal and the bearing.

Determining the magnitude and direction of the force to be resisted is a matter of engineering. It will be found that the force is approximately normal to the plane containing the axes of the two sets of gears. The gear load must be considered as well as the hydraulic load, with the result that the gear load adds to the hydraulic load on the driven gear and subtracts from it on the driving gear so that the total force against the trunnions is not exactly the same for driving and driven gears. With the direction and magnitude of the force known for a given delivery pressure, the area of the trunnion which must be exposed to this same delivery pressure to balance the load may be readily computed. In a practical case, it has been found that applying hydraulic pressure to a foraminous zone covering approximately one-third of the circumference of the bearing provides the desired loading with a reasonable length of trunnion.

The structure by which the bearings are hydraulically loaded is shown most particularly in Figures 5 and 6, Figure 5 being a face or end view of center bearing plate 51 and Figure 6 being a section therethrough taken on a plane passing through the axis of the gear and containing the vector of the radial load which is to be resisted. Narrow circumferential grooves 71 are cut in the sleeves 53 on the side of the bearing toward the pump inlet and similar grooves 72 are cut in a zone at the opposite side. As will be most clearly apparent from Figure 5, these grooves extend approximately 120° around the pump axis. The exact distance is a matter of calculation. Longitudinal grooves 74 and 76 are cut in the outer surface of each bushing 53. The grooves 74 connect through radial holes 77 with the grooves 71 and the passages 76 connect with grooves 72 through small radial bores 78. A circumferential groove 79 extends from groove 74 approximately 120° around the circumference of each bushing 53 adjacent the gear face end thereof. A notch 81 connects each groove 79 with the outer face of the sleeve 53 adjacent the meshing point of the gear teeth. A shallow recess 82 formed in each face of bearing plate 51 is in connection with the meshing zone of the adjacent gear teeth. As will be apparent, the recess 82 is constantly in connection with pump discharge pressure. Therefore, the fluid being pumped at this pressure bleeds from recess 82 through passages 81, 79, 74, and 77 into grooves 71 where it exerts pump discharge pressure against the gear trunnion. It will be noted that the grooves are rather closely spaced and are narrow so that the pressure is exerted generally over the area adjacent and between the grooves 71, which may be regarded as a foraminous zone. The fluid can, of course, seep around the trunnion and out the ends but is constantly renewed through the passages described.

The fluid is bled off at the opposite side of the bearing through the grooves 72, radial passages 78, and longitudinal passages 76, the latter of which extend to the end of the bearing sleeve 53 remote from the gear face where they discharge into the annular space 84 between the adjacent sleeves. The discharge can flow between the ends of adjacent gear trunnions into the space within the trunnions which is at gear pump inlet pressure.

The end bearing plates 52 and the bearing sleeves 53 therein are similarly arranged to provide a fluid load on the trunnions. Leakage from the left hand bearing plate 52 enters a cavity 86 in the drive end casting 11 and that from the right hand plate 52 similarly flows out of the right ends of the shafts into the space between the end casting 14 and the gear pump.

Figure 2:
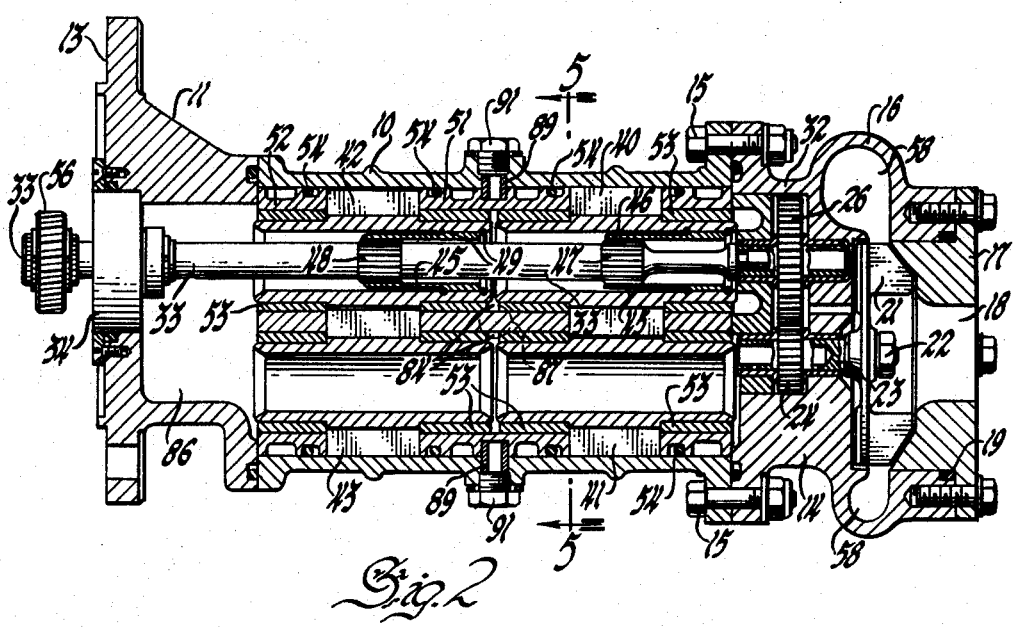
Figure 2 is a vertical sectional view of the same taken in a plane containing the axes of the pump shafts.

These cavities and the interiors of the pump gear shafts are in communication with pump inlet pressure; that is, with the discharge of the centrifugal pump. Any convenient connection may be provided for this purpose but preferably the inlet conduit 61 is in communication with the space between the bushings 53 mounted in the center bearing plate 51 through a radial passage extending through the inner wall of the inlet duct 61 and through the central part of the bearing plate. The location of this passage, which is ahead of the section plane of Figure 2, is indicated by the broken line circle designated 87.

By making the slots very narrow, the remaining effective area of bearing is not materially reduced and retains the area required to support the load and maintain alignment of the shaft with the bearing. The fluid pressure remains constant at maximum value between the outer edges of the extreme end grooves and drops off to pump inlet pressure at the outer ends of the bearing or the pressure in the gear cavity existing at the edge of the bearing. This pressure is practically inlet pressure in the case of the pressure slots and fairly high at the vent slots.

The center bearing plate 51 is held in position longitudinally of the pump by two dowels 89 extending through bosses in the body 10 and into bores in the bearing plate. These dowels are retained by cap screws 91. The outer bearing plates 52 abut the inner faces of the two end castings and are thus located. It will be understood that pressure in the gear cavity tends to urge the end bearing plates firmly against the end castings and thus maintain the established clearance between the faces of the gears and the bearing plates.

The drive end casting is provided with two drain holes 93, one in the upper and one in the lower side of the pump as illustrated in Figure 1, so that the pump can be mounted as illustrated or inverted. The passage 93 communicates with the left face of the flange 13 to drain off any leakage through the seal 34.

The shafts of the centrifugal pump driving gears 26 and 24 are lubricated by fuel from within the body of the pump which may flow into the inner ends of the hollow shafts of the gears and flow outwardly through radial passages 94 in the shafts into the bearings. This fuel is subject to the delivery pressure of the centrifugal pump plus the slight centrifugal pressure due to rotation of the gear shafts. The lubricant may escape at the impeller end of shaft 23 and also may escape past the thrust bearing portion of the bushings into the cavity 96 in which the gears are mounted, from which it can flow through a bore 97 into the space back of the impeller 21. The end thrust on impeller 21 pushing it to the left is caused by hydraulic pressure acting on the area of disk of impeller 21. Similar hydraulic pressure is induced in an opposite direction upon the rotor disk by narrow blades 98 such that the end thrust on the rotor is substantially balanced. Hydraulic pressure from these short blades is maintained by trapping the fuel at the close clearance between the outer edge of rotor disk and the housing 14.

While the invention has been described in connection with the double gear pump combined with a centrifugal priming pump, it will be apparent that the gear pump features of the invention could be retained in the absence of the associated centrifugal priming pump simply by installing a plain end casting with a bearing for the end of the drive shaft 33 in place of the end casting shown which contains the centrifugal pump and driving gears. The inlet may be through such an end case, or through the boss 99 on the body. This boss may also be used as an inlet and the pump 21 may discharge into it through an external filter or other device, not shown, by providing a conventional external outlet for scroll 58.

It will also be apparent that the invention as described in the gear pump with relation to counteracting the loads on the trunnions is equally capable of being applied to a single gear pump which, in effect, could amount to either half of the double gear pump shown. In the case of a single gear pump, two bearing plates such as plates 52 could be employed, bearing against the end plates of the pump, and the center bearing plate 51 would be omitted.

It will also be apparent that the bearing loading principles of the invention are equally applicable to a pump in which the bearing is a stationary shaft on which the gear rotates rather than a stationary sleeve in which the gear or its trunnion rotates.

The pump according to the invention is particularly adapted for production in quantity with a very high degree of precision and a minimum of skilled assembly. The internal passage 50 in the body 10 can be formed precisely by broaching. The bearing plates can be precisely formed on their peripheries to fit the cavity 50 by external broaching of these parts. The bearing plates may be located for broaching by the bores for the bearing sleeves so that the bearings are all precisely aligned.

In assembling the gear pump, the gears and end plates may be put in position with a film of lubricating oil between the faces of the gears and the faces of the bearing plates. A film of oil of suitable viscosity will maintain the desired very small clearance between the gears and bearing plates. The exact amount of clearance desired may vary with the composition of the fuel. With the parts thus assembled, the end faces of the body 10 and bearing plates can be ground to lie exactly in the same plane so that the flat inner faces of the end castings will hold the bearing plates with the exact clearance desired from the gears. Also, with the parts thus stacked with the oil film maintaining proper spacing, the holes in the body and in the bearing plate 51 for the dowels 89 can be reamed so that the pins will precisely locate this part. The end castings are simply bolted on the body after the gears and the bearings are installed with the coupling members 45 in place. The shaft 34 can be inserted before or after the pump is assembled. The precise alignment of the end plates with the body is obtained by pins extending through the flanges at the junction of these parts such as pins 101 (Figure 4) between the body 10 and the end casting 14.

It will be apparent from the foregoing that the invention provides a pump of great simplicity and one readily adapted for precise manufacture. It will also be noted that the provision for resisting gear loading on the pump trunnions is particularly adapted to successful accomplishment of this end. Tests on a pump having this balancing provision have demonstrated that no rubbing between the trunnions and the bearing occurs as demonstrated by failure to rub off blue coating applied to the trunnions before running such tests. Misalignment of shaft 33 does not load the trunnions.

The detailed description herein of the preferred embodiment of the invention for the purpose of explaining the principles thereof is not to be construed as limiting the invention, as many modifications may be made by the exercise of skill in the art within the principles thereof.

I claim:
1. A pump comprising, in combination, a casing defining a pump cavity, an inlet to the pump cavity, and an outlet from the pump cavity; a pumping rotor mounted in the pump cavity for rotation about an axis; means rotatably mounting the rotor comprising a bearing part fixed to the casing and a part rotating with the rotor, the bearing part being in contact with the rotating part through the major portion of the axial extent of both thereof throughout the circumference of the bearing part, the said parts being concentric with the said axis; the rotor being of a type developing in operation a force normal to the axis the magnitude of which is a function of the pressure in the pump outlet; and means for exerting a force on the rotor counteracting the first-mentioned force comprising substantially diametrically opposed foraminous zones, having bearing surfaces within the area of each zone, in the bearing part of the mounting means at opposite sides of the said axis and conduit means connecting the zones to the pump inlet and outlet, respectively; the areas of the zones being such that the difference of the products of the areas by the respective pressures exerted therein substantially equals the first-mentioned force.

2. A pump comprising, in combination, a casing defining a pump cavity, an inlet to the pump cavity, and an outlet from the pump cavity; a pumping rotor mounted in the pump cavity for rotation about an axis; means rotatably mounting the rotor comprising a bearing part fixed to the casing and a part rotating with the rotor, the bearing part being in contact with the rotating part through the major portion of the axial extent of both thereof throughout the circumference of the bearing part, the said parts being concentric with the said axis; the rotor being of a type developing in operation a force normal to the axis the magnitude of which is a function of the pressure in the pump outlet; and means for exerting a force on the rotor counteracting the first-mentioned force comprising substantially diametrically opposed foraminous zones defined by narrow closely spaced circumferentially extending slots in the bearing part of the mounting means at opposite sides of the said axis, the said part having bearing surfaces between the slots, and conduit means connecting the zones to the pump inlet and outlet, respectively; the areas of the zones being such that the difference of the products of the areas by the respective pressures exerted therein substantially equals the first-mentioned force.

3. A pump comprising, in combination, a casing defining a pump cavity, an inlet to the pump cavity, and an outlet from the pump cavity; a pumping rotor mounted in the pump cavity for rotation about an axis; means concentric with the said axis rotatably mounting the rotor comprising a bearing fixed in the casing and a journal rotating with the rotor in the bearing; the bearing being in contact with the journal through the major portion of the axial extent of both thereof throughout the circumference of the bearing, the rotor being of a type developing in operation a force normal to the axis the magnitude of which is a function of the pressure in the pump outlet; and means for exerting a force on the rotor counteracting the first-mentioned force comprising substantially diametrically opposed foraminous zones defined by narrow closely spaced circumferentially extending slots in the bearing at opposite sides of the said axis, the bearing having bearing surfaces between the slots, and conduit means connecting the zones to the pump inlet and outlet, respectively; the areas of the zones being such that the difference of the products of the areas by the respective pressures exerted therein substantially equals the first-mentioned force.

4. A device comprising, in combination, two rotary members, the members having coaxial hollow shafts with splines, elongated drive shaft means for the rotary members coaxial with the hollow shafts and spaced therefrom and having splines, and two coupling members, each coupling member having two sets of splines spaced axially of the coupling member splined respectively to the splines of the drive shaft means and to the splines of one of the hollow shafts at a zone spaced axially of the shafts from the splined connection to the drive shaft means, each coupling member including a shear section between the sets of splines thereon.

5. A pumping device comprising, in combination, two positive-displacement pumps each including a rotary pumping member, the members having coaxial hollow shafts with splines, elongated drive shaft means for the pumps coaxial with the hollow shafts and spaced therefrom and having splines, and two coupling members, each coupling member having two sets of splines spaced axially of the coupling member splined respectively to the splines of the drive shaft means and to the splines of one of the hollow shafts at a zone spaced axially of the shafts from the splined connection to the drive shaft means, each coupling member including a shear section between the sets of splines thereon.

6. A pumping device comprising, in combination, two positive-displacement pumps each including a rotary pumping member, the members having coaxial hollow shafts with splines, elongated drive shaft means for the pumps coaxial with the hollow shafts and spaced therefrom and having splines, and two coupling members, each coupling member having two sets of splines spaced axially of the coupling member splined respectively to the splines of the drive shaft means and to the splines of one of the hollow shafts at a zone spaced axially of the shafts from the splined connection to the drive shaft means, each coupling member including a shear section between the sets of splines thereon, the coupling members being inclinable to the axis of the shafts to accommodate misalignment of the drive shaft means and the hollow shafts coupled thereby.

7. A pumping device comprising, in combination, two positive-displacement pumps each including a rotary pumping member, the members having coaxial hollow shafts with splines, elongated drive shaft means for the pumps coaxial with the hollow shafts and spaced therefrom and having splines, and two coupling members, each coupling member having two sets of splines spaced axially of the coupling member splined respectively to the splines of the drive shaft means and to the splines of one of the hollow shafts at a zone spaced axially of the shafts from the splined connection to the drive shaft means, each coupling member including a shear section between the sets of splines thereon; a centrifugal pump connected to deliver fluid to the positive-displacement pumps, and means including a shear section coupling the drive shaft means to the centrifugal pump.

References Cited in the file of this patent

UNITED STATES PATENTS

| | | |
|---|---|---|
| 724,684 | Edwards | Apr. 7, 1903 |
| 1,339,273 | Miller | May 4, 1920 |
| 1,646,427 | Skidmore | Oct. 25, 1927 |
| 1,673,259 | Meston et al. | June 12, 1928 |
| 1,771,863 | Schmidt | July 29, 1930 |
| 1,941,061 | Thiry | Dec. 26, 1933 |
| 2,009,137 | Kleckner | July 23, 1935 |
| 2,040,754 | McLeod | May 12, 1936 |
| 2,055,014 | Manger | Sept. 22, 1936 |
| 2,164,485 | Yantis | July 4, 1939 |
| 2,173,578 | Egersdorfer et al. | Sept. 19, 1939 |
| 2,212,994 | Vrolix | Aug. 27, 1940 |
| 2,221,412 | Rose | Nov. 12, 1940 |
| 2,293,126 | Fersing | Aug. 18, 1942 |
| 2,319,374 | Ungar | May 18, 1943 |
| 2,382,042 | Etnyre | Aug. 14, 1945 |
| 2,479,077 | McAlvay | Aug. 16, 1949 |
| 2,539,534 | Eckhardt | Jan. 30, 1951 |
| 2,620,553 | Schultz | Dec. 9, 1952 |
| 2,641,192 | Lindberg | June 9, 1953 |
| 2,665,637 | Lauck | Jan. 12, 1954 |
| 2,665,638 | Lauck | Jan. 12, 1954 |
| 2,699,724 | Murray et al. | Jan. 18, 1955 |
| 2,707,441 | Drennen | May 3, 1955 |
| 2,714,856 | Kane | Aug. 9, 1955 |
| 2,726,604 | Aspelin et al. | Dec. 13, 1955 |
| 2,735,372 | Booth et al. | Feb. 21, 1956 |
| 2,746,394 | Dolza et al. | May 22, 1956 |
| 2,749,778 | Kuhn | June 12, 1956 |
| 2,751,846 | Lapsley | June 26, 1956 |
| 2,758,548 | Rockwell | Aug. 14, 1956 |
| 2,772,638 | Nagely | Dec. 4, 1956 |

FOREIGN PATENTS

| | | |
|---|---|---|
| 588,303 | Great Britain | May 20, 1947 |
| 993,467 | France | July 25, 1951 |